(12) United States Patent
Mun

(10) Patent No.: US 6,246,550 B1
(45) Date of Patent: Jun. 12, 2001

(54) HEAD DRUM FOR RECORDING AND REPRODUCING APPARATUS

(75) Inventor: Ki Sung Mun, Osan (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/440,576

(22) Filed: Nov. 16, 1999

(30) Foreign Application Priority Data

Dec. 3, 1998 (KR) .................................................. 98/52709

(51) Int. Cl.$^7$ .................................................. G11B 5/52
(52) U.S. Cl. .......................................................... 360/271.1
(58) Field of Search ............................... 360/271.1–271.9

(56) References Cited

U.S. PATENT DOCUMENTS 5,442,506 * 8/1995 Kang ..................................... 360/107

* cited by examiner

Primary Examiner—Robert S. Tupper

(57) ABSTRACT

A head drum for a recording and reproducing apparatus is disclosed. This head drum for a recording and reproducing apparatus according to the present invention includes a lower drum installed at a lower portion of a center shaft, an upper drum rotating about the center shaft at an upper portion of the lower drum, and a head drum grounding apparatus which includes a grounding means formed of a contact member contacting with a portion of the upper drum and an elastic member fixed at an end of the contact member and having different diameters at its multiple steps, and a receiving means inserted into the center shaft and having an installation hole for receiving the grounding means, for thereby enhancing a reliability of a head drum grounding apparatus by obtaining a reliable grounding of a tip brush and preventing a noise which occurs at the tip brush.

13 Claims, 5 Drawing Sheets

HEAD DRUM FOR RECORDING AND REPRODUCING APPARATUS

BACKGROUND OF THE INVENTION

1. Field of the Invention

The present invention relates to a head drum for a recording and reproducing apparatus, and in particular to a head drum for a recording and reproducing apparatus which is capable of enhancing a reliability of a grounding apparatus which implements an electric connection between an upper drum and a lower drum of a head drum and preventing a noise due to a grounding apparatus during an operation of the head drum.

2. Description of the Background Art

FIG. 1 is a view illustrating the construction of a fixed type head drum for a recording and reproducing apparatus. The construction of the head drum is as follows.

A lower drum is press-fitted onto a lower portion of a center shaft 30, and an upper drum 20 is rotatably engaged at an upper portion of the same by interleaving upper and lower bearings 21a and 21b.

A head drum 22 is installed at the upper drum 20 for recording a signal into a tape and reproducing the signal recorded on the tape, and a rotor 23 is engaged at an upper drum 20 by an engaging screw 24 for rotating the upper drum 20.

A stator 25 is fixed at an upper portion of the center shaft 30 for rotating the rotor 23 by an electric operation with the rotor 23.

In the head drum for a recording and reproducing apparatus, the upper drum 20 is insulated by a lubricant formed on bearing balls(not shown) of the upper and lower bearings 21a and 21b for thereby being electrically separated from the lower drum 10.

Therefore, a head drum grounding apparatus is installed below the stator 25 for an electrical connection of the lower drum 10 and the upper drum 20. The construction of the conventional head drum grounding apparatus will be explained with reference to FIGS. 2 and 3.

FIG. 2 is a cross-sectional view illustrating the portion A of FIG. 1 which illustrates a conventional head drum grounding apparatus, and FIG. 3 is an exploded perspective view illustrating the construction of a conventional head drum grounding apparatus.

As shown therein, the conventional head drum grounding apparatus includes a ring collar 40 and a tip brush 50.

The ring collar 40 includes an insertion hole 41 into which the center shaft 30 is inserted. An engaging hole 42 communicates with the center shaft 30 in a horizontal direction. The ring collar 40 is engaged to the center shaft 30 using the engaging screw 30 via the engaging hole 42.

An installation hole 44 is formed at one side of the ring collar 40 for engaging a tip brush 50 which will be described later.

The tip brush 50 contacts with the upper drum 20 for electrically connecting the upper drum 20 and the lower drum 10. As shown in FIG. 3, there is provided a brush body 51 made of a carbon material, and a ground spring 52 is fixed at a portion of the brush body 51.

The brush body 51 includes a semicircular contact portion 51a and a connection portion 51b at both ends of the brush body 51. On end of the brush body 51, namely, a contact portion 51a contacts with the upper bearing 21a, the other end of the brush body 51, namely, a connection portion 51b is fixed at the ground spring 52.

One end of the ground spring 52 is connected with the connection portion 51b of the brush body 51 using a conductive adherent material 53.

In the thusly constituted head drum grounding apparatus, the tip brush 50 is installed at the installation hole 44 of the ring collar 40, and one end of the tip brush 50, namely, the contact portion 51a of the brush body 51 contacts with the upper bearing 21a by an elastic force of the ground spring 52, and the other end of the tip brush 50, namely, one end of the ground spring 52 contacts with a lower surface of the stator 25.

In this state, the lower surface of the stator 25 is formed of a phenol which is an insulation material for thereby implementing an insulated state with the ground spring 52. Therefore, the ground spring 52 contacts with an inner surface of the installation hole 44 of the ring collar 40 for thereby implementing a grounded state of the upper drum 20.

In other words, the grounding path is as follows: the upper drum 20→the upper bearing 21a→the contact portion 51a of the brush body 51→the ground spring 52→the inner surface of the installation hole 44 of the ring collar 40→the center shaft 30→the lower drum 10. Therefore, a main substrate(not shown) of the recording and reproducing apparatus is grounded via the above-described paths.

In the conventional head drum grounding apparatus, a certain distance is formed between the installation hole 44 and the tip brush 50 so that the tip brush 50 is upwardly and downwardly movable by an elastic force of the ground spring 52 in the installation hole 44 of the ring collar 40. Therefore, in the conventional art, a contact between the ground spring and the inner surface of the installation hole is not obtained due to the above-described distance, so that it is impossible to obtain an accurate grounding of the tip brush.

In addition, since the ratio between the length of the ground spring and the distance between the inner surface of the installation hole and the ground spring is relatively great, the ground spring may be flexed, so that the brush body 51 may be vibrated. A friction noise may occur at a contact portion of an inner wall of the installation hole 44 of the ring collar 40 due to the flexed grounding spring 52.

The conduction adherent material used for fixing the ground spring 52 to the brush body 51 is protruded beyond the outer surface of the brush body 51, so that it is difficult to install the tip brush 50 at the installation hole 44 of the ring collar 40.

SUMMARY OF THE INVENTION

Accordingly, it is an object of the present invention to provide a head drum for a recording and reproducing apparatus which is capable of enhancing a reliability of a head drum grounding apparatus by obtaining a reliable grounding of a tip brush and preventing a noise which occurs at the tip brush.

To achieve the above objects, there is provided a head drum for a recording and reproducing apparatus according to the present invention which includes a lower drum installed at a lower portion of a center shaft, an upper drum rotating about the center shaft at an upper portion of the lower drum, and a head drum grounding apparatus which includes a grounding means formed of a contact member contacting with a portion of the upper drum and an elastic member fixed at an end of the contact member and having different diameters at its multiple steps, and a receiving means inserted into the center shaft and having an installation hole for receiving the grounding means.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be explained with reference to the accompanying drawings.

Figure 1:
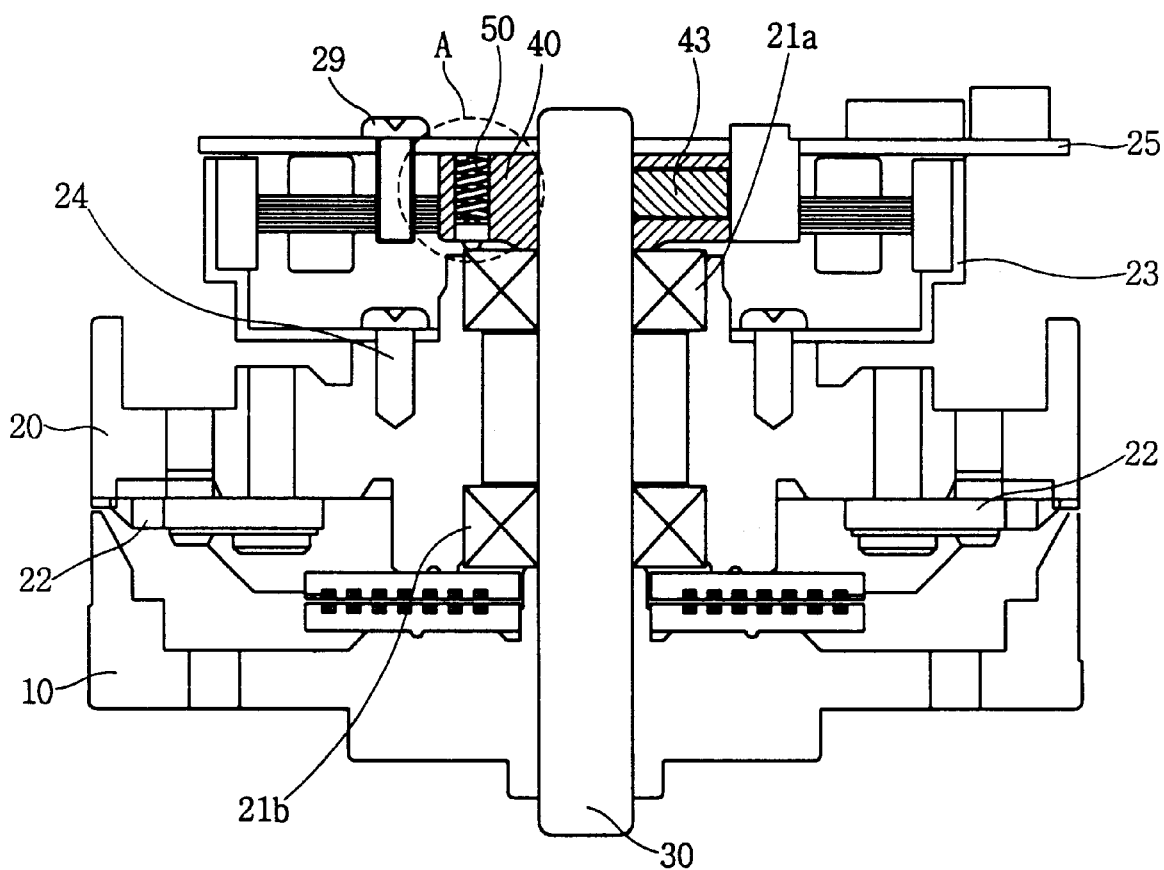
FIG. 1 is a cross-sectional view illustrating the construction of a shaft fixed type head drum for a conventional recording and reproducing apparatus.
Figure 2:
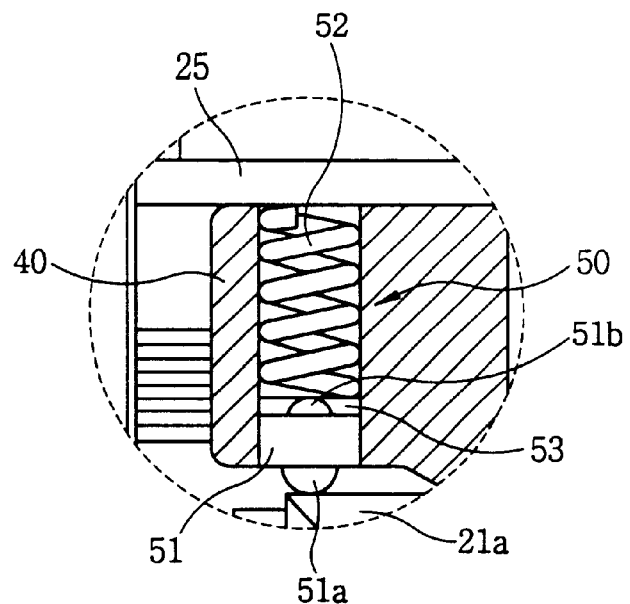
FIG. 2 is a detailed cross-sectional view illustrating the portion A of FIG. 1 which shows a grounding apparatus for a head drum in the conventional art.
Figure 3:
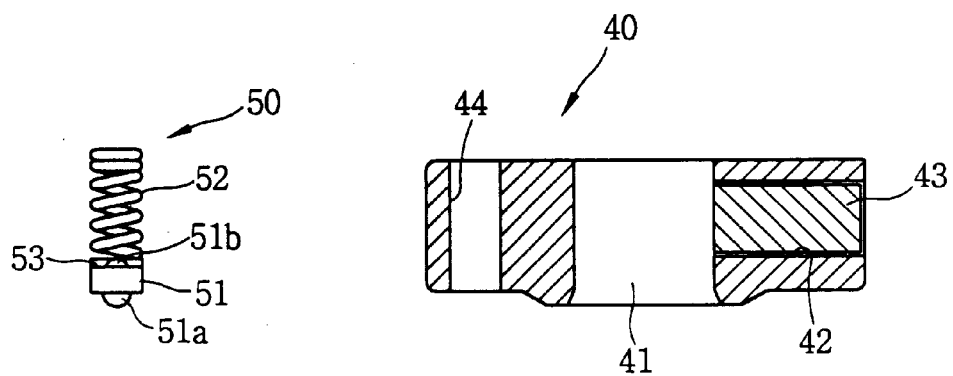
FIG. 3 is an exploded perspective view illustrating the construction of a conventional head drum grounding apparatus.
Figure 4:
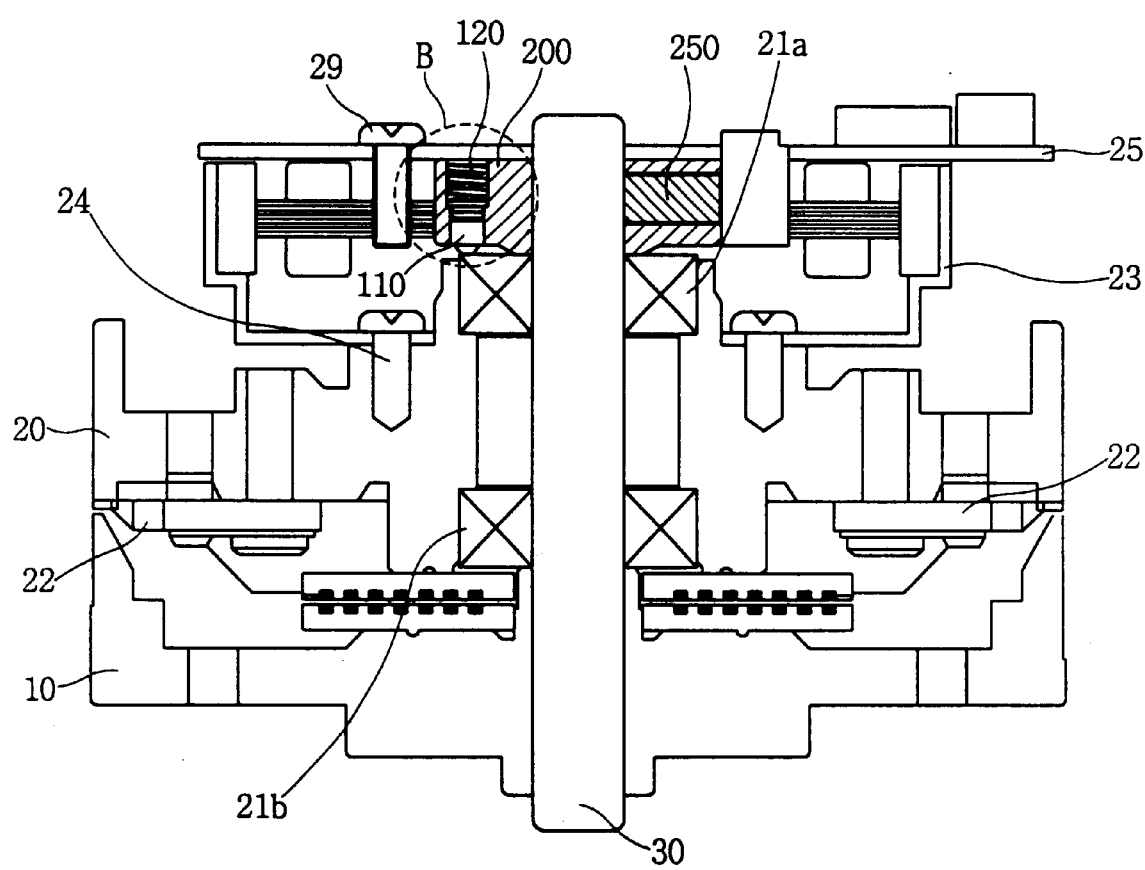
FIG. 4 is a cross-sectional view illustrating the construction of a head drum which adapts a head drum grounding apparatus for a recording and reproducing apparatus according to the present invention.
Figure 5:
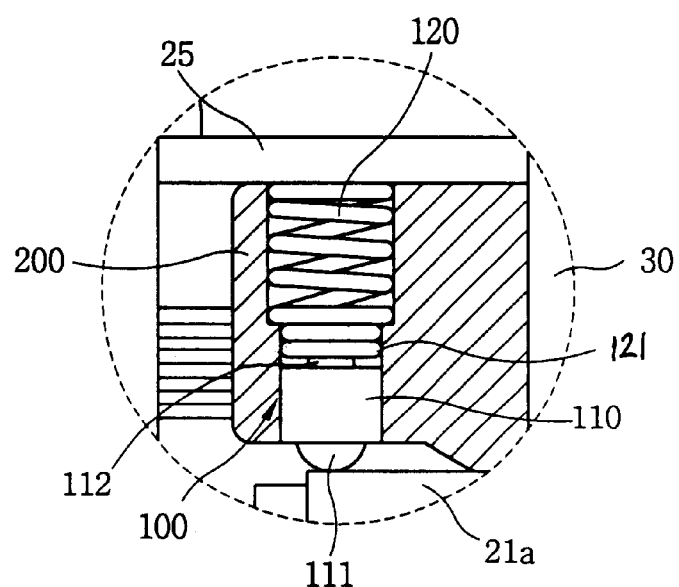
FIG. 5 is a detailed cross-sectional view illustrating the portion B of FIG. 4 which shows a head drum grounding apparatus of a head drum according to the present invention.

FIGS. 4 through 7 illustrate the head drum according an embodiment of the present invention. FIG. 4 is a cross-sectional view illustrating the construction of a head drum for a recording and reproducing apparatus according to the present invention, and FIG. 5 is a detailed cross-sectional view illustrating the portion B of FIG. 4.

Figure 6:
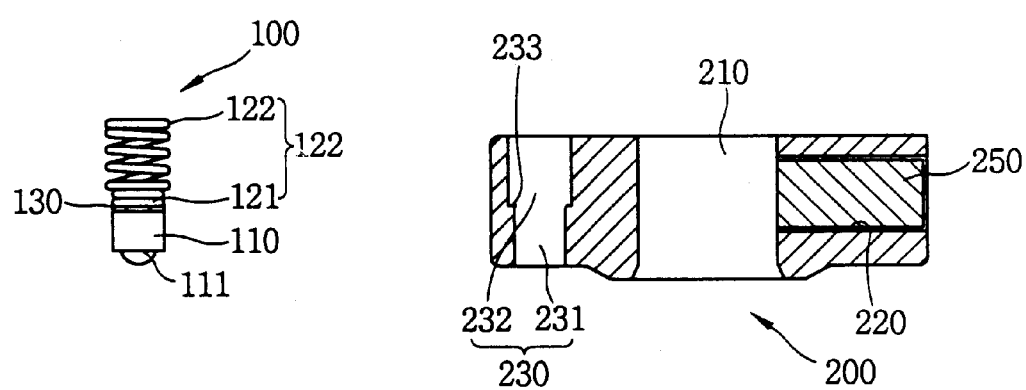
FIG. 6 is an exploded cross-sectional view illustrating the construction of a head drum grounding apparatus according to the present invention.
Figure 7:
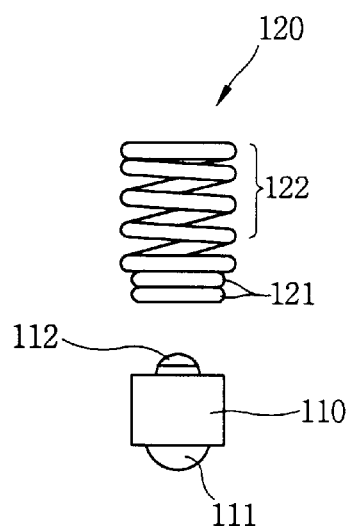
FIG. 7 is an exploded perspective view illustrating the construction of a tip brush of a head drum grounding apparatus according to an embodiment of the present invention.

In addition, FIG. 6 is an exploded cross-sectional view illustrating the constriction of a head drum grounding apparatus according to the present invention, and FIG. 7 is an exploded perspective view illustrating the construction of a tip brush of a head drum grounding apparatus according to the present invention.

The description of the same construction of the head drum as the conventional art will be omitted, and the same reference numerals are given to the same elements.

The head drum according to the present invention includes a lower drum 10, an upper drum 20, and a head drum grounding apparatus engaged at a lower portion of a stator 25 for electrically connecting the lower drum 10 and the upper drum 20.

The head drum grounding apparatus includes a tip brush 100 which is a grounding member contacted with the upper drum 20, and a ring collar 200 for engaging the tip brush 100.

The tip brush 100 includes a contact member 110 made of a carbon material, and a coil spring-shaped elastic member 120 fixed at one end of the contact member 110.

The contact member 110 is the brush body 110 which is formed in a pole shape having both rounded ends and is formed of a semicircular protrusion formed at both ends in a cylindrical column shape. One end of the brush body 110 becomes a contact portion 111 contacting with the upper bearing 21a, and the other end of the same becomes a connection portion 112 connected with the elastic member 120.

The connection portion 112 has an outer diameter smaller than that of the brush body 110.

The elastic member 120 is a coil shaped grounding spring having different diameters in its lower and upper portions. In detail, a small diameter portion 121 has a smaller diameter compared to that of a large diameter portion 122.

The small diameter portion 121 has a diameter smaller than that of the brush body 110 and is fixed at the connection portion 112 of the brush body 110, and the large diameter portion 122 is engaged on the lower surface of the stator 25.

The ground spring 120 is fixed using the conductive adherent material 130 in a state that the small diameter portion 121 is inserted into the connection portion 112 of the brush body 110.

The ring collar 200 which receives the tip brush 100 which is the grounding member includes an insertion hole 210 into which the center shaft 30 of the head drum is inserted, and an engaging hole 220 which communicates with the insertion hole 210 in the horizontal direction and is engaged at the center shaft 30 using the engaging screw 250.

The installation hole 230 is formed at one side of the ring collar 200 for installing the tip brush 100.

The installation hole 230 includes a first receiving portion 231 for receiving the brush body 110 and a small diameter portion 121 of the grounding spring 120, and a second receiving portion 232 for receiving the large diameter portion 122 of the ground spring 120.

In other words, the holes are formed to correspond with the tip brush 100.

The step portion extended from the first receiving portion 231 to the second receiving portion 232, namely, the curbed surface extended from the first receiving portion 231 to the second receiving portion 232 becomes a ground surface 233 closely contacting with an outer end portion of the large diameter portion 122 of the ground spring 120.

The assembling process of the head drum which includes a head drum grounding apparatus according to an embodiment of the present invention will be explained.

The center shaft 30 is press-fitted into the lower drum 10, and the upper drum 20 is inserted into the center shaft 30 of the lower drum 101 and the ring collar 200 is inserted into the center shaft 30. As a result, a resultant structure is disposed on the upper surface of the upper drum 20.

The ring collar 200 is engaged to the center shaft 30 using the engaging screw 250 via the engaging hole 220.

Continuously, the tip brush 100 is inserted into the installation hole 230 of the ring collar 200, and the stator 25 is engaged at the upper surface of the ring collar 200 for thereby finishing an assembling operation of the head drum.

At this time, the large diameter portion 122 of the ground spring 120 is positioned at the second receiving portion 232 of the installation hole 230, and one end of the same is closely contacted with the lower surface of the stator 25, and an outer portion of the other end is closely contacted with the ground surface 233 of the installation hole 230 of the ring collar 200, and the small diameter portion 120 of the ground spring 120 and the brush body 110 are provided at the first receiving portion 231.

The contact portion 111 formed at one end of the brush body 100 contacts with the upper bearing 21a by an elastic force of the ground spring 120.

Since the ground surface 233 of the installation hole 230 is formed in a direction vertical with respect to the elastic force direction of the ground spring 120, one end of the large diameter portion 122 of the ground spring 120 is closely contacted with the ground surface 233 of the installation hole 230 for thereby implementing an accurate grounded state.

The ratio between the diameters of the first and second receiving portions 231 and 232 of the installation hole 230 and the lengths of the large and small diameter portions 122 and 121 of the ground spring 120 is relatively decreased, so that the ground spring 120 is accurately installed in the installation hole 230 for thereby preventing a certain noise during the operation of the head drum.

In addition, since the small diameter portion 121 of the ground spring 120 has a diameter smaller than that of the brush body 110, the conductive adherent material 130 is not protruded beyond the outer portion of the brush body 110 when fixing the small diameter portion 121 at the connection portion 112 of the brush body 110, so that it is possible to easily engage the tip brush 10 at the installation hole 230 of the ring collar 200.

The head drum grounding apparatus according to another embodiment of the present invention will be explained with reference to FIG. 8.

Figure 8:
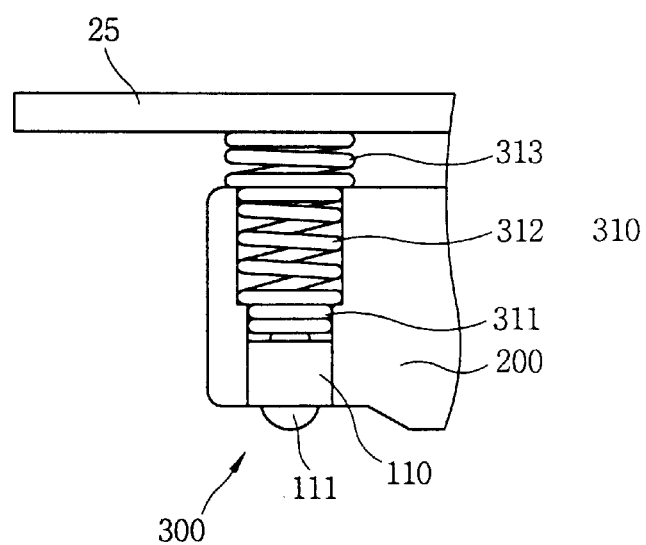
FIG. 8 is a cross-sectional view illustrating the construction of a head drum grounding apparatus according to another embodiment of the present invention.

FIG. 8 is a cross-sectional view illustrating the construction of a head drum grounding apparatus according to the present invention. The same reference numerals are given to the same elements as the first embodiment of the present invention.

As shown therein, the head drum grounding apparatus according to another embodiment of the present invention includes a tip brush 300 which is the grounding unit, and a ring collar 200 which is a receiving unit for receiving the tip brush 300.

The tip brush 300 includes a brush body 100 which is a contact member contacting with one side of the upper drum 20, and a ground spring 310 which is an elastic member fixed to one end of the brush body 110.

The brush body 110 has the same construction as the brush body of the first embodiment of the present invention. Therefore, the description thereof will be omitted except for the description of the ground spring 310.

The ground spring 310 has three different diameters. The ground spring 310 includes a small diameter portion 311 having a diameter smaller than that of the brush body 110 and fixed at one end of the brush body 110, a large diameter portion 312 connected with the small diameter portion 311 and having a diameter larger than that of the brush body 110, and a fixing portion 313 connected with the large diameter portion 312 and having a diameter larger than that of the large diameter portion 312.

When the tip brush 300 having the ground spring 320 is installed at the installation hole 230 of the ring collar 200, the small diameter portion 311 is received in the first receiving portion 231 of the installation hole 230, and the large diameter portion 312 is received in the second receiving portion 232 of the installation hole 230, and one end of the same is closely contacted with the ground surface 233, and one end portion of the fixing portion 313 is closely contacted with the upper surface of the ring collar 200, and the other end portion is closely contacted with the lower surface of the stator 25 for thereby implementing a stable installation state.

As described above, the head drum for a recording and reproducing apparatus according to the present invention is capable of enhancing a reliability of the head drum grounding apparatus by providing an elastic member of the grounding unit having different diameters and securing an accurate grounding state with the receiving unit when the grounding operation of the upper drum is performed.

In addition, the ratio between the diameter of the receiving unit installation hole and the length of the elastic member is relatively decreased, so that the elastic member is accurately installed, and a certain noise which is generated during an operation of the head drum, is prevented.

When engaging the contact member of the grounding unit and the elastic member, it is possible to prevent an over protruded portion formed by an over conductive adherent material supply for thereby implementing an easier installation of the same at a receiving unit for receiving the grounding unit.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. A head drum for a recording and reproducing apparatus, comprising:

a lower drum installed at a lower portion of a center shaft;

an upper drum rotating about the center shaft at an upper portion of the lower drum; and a head drum grounding apparatus which includes a grounding means formed of a contact member contacting with a portion of the upper drum and an elastic member connected at an end of the contact member and having different diameters at its multiple steps, and a receiving means inserted into the center shaft and having an installation hole for receiving the grounding means.

2. The head drum of claim 1, wherein said elastic member is a coil spring having two different diameters and has a portion which is connected at the contact member and has a diameter smaller than that of another portion.

3. The head drum of claim 1, wherein said elastic member includes:

a first diameter portion having a diameter smaller than that of the contact member; and a second diameter portion having a diameter larger than that of the contact member.

4. The head drum of claim 1, wherein said contact member includes:

a cylindrical column shaped body; and a semicircular protrusion formed at both ends of the same, wherein a protrusion connected with the elastic member is connected with a portion having a smaller diameter portion of the elastic member.

5. The head drum of claim 1, wherein said contact member has both rounded pole shaped ends in which one end connected with the elastic member is connected with a portion having a smaller diameter portion of the elastic member.

6. The head drum of claim 1, wherein said installation hole of the receiving means is formed in a certain shape corresponding to the shape for engaging the contact member and elastic member wherein a curved surface between different diameter portions of the same becomes a contact surface contacting with a different diameter portion of the elastic member.

7. The head drum of claim 1, wherein said contact member is formed in a pole shape having both rounded ends, and said elastic member is connected with one end of the pole and includes a coil spring having a first diameter portion smaller than that of the pole and a second diameter portion larger than that of the pole, said installation hole is formed of a first receiving portion for receiving the first diameter portion and a second receiving portion for receiving the second diameter portion, and a surface curbed and extended from the first receiving portion to the second receiving portion contacts with one end of the second diameter portion of the elastic member.

8. In a head drum for a recording and reproducing apparatus having a rotation drum and a non-rotation drum, a head drum grounding apparatus for a recording and reproducing apparatus, comprising:

a grounding means including a contact member having a contact portion contacting with one side of the rotation drum and an elastic member connected at one end of the contact member and having a plurality of different diameter portions;

a receiving means for receiving the grounding means and implementing an electrical connection of the rotation drum for the non-rotation drum through the contact member and elastic member.

9. The apparatus of claim 8, wherein said elastic member includes:

a small diameter portion connected with one end of the contact member and has a diameter smaller than that of the contact member; and a large diameter portion extended from the small diameter portion and having a diameter larger than that of the contact member.

10. The apparatus of claim 9, wherein said elastic member is a coil spring.

11. The apparatus of claim 8, wherein said contact member has both rounded ends in a pole shape, and one end connected with the elastic member is connected with a portion having a diameter smaller than that of the elastic member.

12. The apparatus of claim 8, wherein said receiving means includes an installation hole corresponding with the grounding means, in which a connection extended surface between different diameter portions becomes a grounding surface contacting with a diameter different portion of the elastic member.

13. The apparatus of claim 8, wherein said elastic member includes a small diameter portion connected with one end of the contact member and having a diameter smaller than that of the contact member, and a large diameter portion extended from the small diameter portion and having a diameter larger than that of the contact member, and said receiving means includes an installation hole formed of a first receiving portion receiving the contact member and the small diameter portion and a second receiving portion receiving the large diameter portion, and a curbed surface which is curbed and extended from the first receiving portion to the second receiving portion of the installation hole becomes a grounding surface contacting with one end of the large diameter portion of the elastic member.

* * * * *